Oct. 3, 1961 R. LICHTENBERGER ET AL 3,002,999
MANUFACTURE OF MESITYL OXIDE
Filed Dec. 21, 1954

United States Patent Office

3,002,999
Patented Oct. 3, 1961

---

3,002,999
MANUFACTURE OF MESITYL OXIDE
Robert Lichtenberger, Oullins, and Lucien Villemey, Lyons, France, assignors to Societe Industrielle des Derives de l'Acetylene (S.I.D.A.), Paris, France, a corporation of France
Filed Dec. 21, 1954, Ser. No. 476,738
Claims priority, application France Dec. 24, 1953
11 Claims. (Cl. 260—593)

The present invention relates to the production of mesityl oxide or of its homologues.

Numerous publications have already described the condensation of ketones—and in particular of acetone—upon themselves. These known methods all produce mixtures of different products in proportions which vary in accordance with the working conditions. Starting for example with acetone, these mixtures will contain one or a number of the following compounds: di-acetone-alcohol, mesityl oxide, mesitylene, tri-acetone-di-alcohol, semi-phoron, phoron, isophoron, as well as the higher products of condensation, the molecule of which contains a number of carbon atoms which is a whole multiple of 3.

It has been shown in certain publications that, at a moderate temperature, the condensation of the acetone on itself in an alkaline medium results in the production of di-acetone-alcohol by a balanced reaction in such a manner that the reaction mixture contains a proportion of di-acetone alcohol which increases as the temperature is reduced.

It is also known that at a sufficiently high temperature, and in an alkaline medium, the acetone condenses as isophoron. This property has already been employed in the manufacture of isophoron, for example by treating acetone by alkaline agents at a temperature of the order of 200° C.; in these conditions, small quantities of mesityl oxide have very often been obtained as a by-product.

It is known, furthermore, that mesityl oxide may be obtained by transformation of the di-acetone alcohol by heat or by acid agents.

Finally, it has already been proposed to prepare mesityl oxide directly along with other products of condensation of acetone, by treatment of acetone with strong acid agents. Up to the present time, however, no practical industrial application of this reaction has been made, both by reason of the complexity of the mixtures obtained and also of the difficulties encountered due to corrosion of the apparatus.

The present invention has the object of overcoming the difficulties and disadvantages referred to above in connection with the known processes; it has for its first object to produce mainly mesityl oxide or its higher homologues, accompanied, as the case may be, by di-acetone alcohol or isophoron or their higher homologues, by condensation of acetone upon itself in an alkaline medium, or by condensation of the ketone homologues of acetone, such as for example methyl-ethyl-ketone, methyl-isobutyl-ketone, cyclo-hexanone, aceto-phenone or the like.

The invention is also directed to the production, starting with acetone and simultaneously or successively, of the oxide of mesityl and of di-acetone-alcohol, a simple treatment of the mixture enabling the mesityl oxide to be obtained from the mixture. Finally, the invention is more particularly concerned with the process of condensation of acetone to mesityl oxide which only gives isophoron as a by-product of any value.

The present invention has for its object a method of preparation of mesityl oxide or its homologues by condensation on itself respectively of acetone or of another ketone in an alkaline medium, this process being essentially characterised in that the acetone or the said other ketone is heated to a temperature comprised between 50° C. and about 160° C., in the presence of an aqueous, alcoholic or mixed water-alcohol solution of a small quantity of alkali metal hydroxide which acts as an alkaline catalyst for the condensation; the heating period may be comprised between ten minutes and several hours, in such a way that there is only obtained the oxide of mesityl and of di-acetone-alcohol and/or in certain cases, isophoron, or their respective homologues.

The alkaline condensation catalyst may be chosen from amongst the alkali metal hydroxides, the solubility of which in acetone is sufficient for the desired condensation to take place in a homogeneous phase, this solubility being increased, if required, by the presence of a further solvent such as water, or preferably a lower alcohol in which the alkaline agent is soluble, and in particular methanol or ethanol. The increase in the proportion of mesityl oxide in the conversion is bound up in practice with the introduction of greater or less quantities of water or of alcohol. The presence of the solvent itself facilitates the reaction of the condensation, on the condition that the medium remains as a homogeneous liquid during the whole period of the operation.

It has been found that an increase in temperature results first of all in an increase in the proportion of conversion of the ketone employed, and particularly in acetone, to mesityl oxide, that this proportion of conversion then falls away if the temperature is again increased, and finally that, for the same temperature, the maximum conversion to mesityl oxide is a function of the concentration of the said catalyst. This maximum is reached under special conditions in the case of each alkali metal hydroxide.

It has also been found that the quantity of isophoron obtained as a by-product is bound up with the nature and with the concentration of the catalyst: a higher concentration of the alkaline agent causes the most condensed derivative to appear at a lower temperature, whilst at the same time the least condensed derivative, the mesityl oxide in the case considered, is produced in quantities which decrease as the temperature rises above that which corresponds to the maximum proportion of conversion.

On the other hand, at a certain pre-determined temperature, the proportion of conversion to mesityl oxide may be increased without appreciably increasing the proportion of conversion to the most condensed derivatives, if the concentration of the alkaline agent is increased.

In addition, the influence of the time of contact on the composition of the products formed, shows itself in the same sense as the influence of temperature; for the same temperature, the optimum time of contact diminishes when the concentration of the catalyst is increased. For a given concentration, the proportion of conversion to mesityl oxide increases with increase in the time of contact, passes through a maximum and then decreases at the same time as the higher derivatives begin to appear.

Account being taken of these various phenomena, in accordance with the method of the invention there is advantage in working, in the case of acetone, at a temperature which is preferably between about 75° C. and 120° C. with a contact period of from 15 to 60 minutes, and preferably using potash as the alkali metal hydroxide. This caustic potash is used in a concentration of 0.5 to 7 g. per litre of acetone. The caustic potash is preferably introduced in the form of an aqueous, alcoholic or mixed water-alcohol solution in which the alkaline agent is present in a concentration of ten to 180 g. per litre of solution; the content of alkaline agent with respect to the acetone and to the solvent, is chosen in such a way that the mixture remains in a perfectly homogeneous state during the course of the reaction.

The method of condensation in accordance with the present invention is particularly well suited to a continuous process of manufacture, which is facilitated by the fact that the charged solution, and the solution in course of conversion, and the solution of the crude product, constitute a single homogeneous liquid phase. In this case, a continuous supply of ketone is fed in, and especially acetone, at the same time as the desired quantity of aqueous, alcoholic, or mixed water-alcohol solution of the alkaline agent, in a reaction zone heated to the selected temperature and having a volume such that the reaction mixture is brought in it up to the said temperature for the required period. The pressure inside the apparatus should be at least equal to the self-induced pressure of the liquid mixture at the temperature of the reaction.

If there is previously present a certain quantity of water or of alcohol in the ketone, and especially of the acetone (which may be the case when a part of this latter is obtained from the non-converted fraction of a preceding operation), this water or this alcohol play the same part as when they are used as a solvent for the alkali metal hydroxide. When the ketone, and especially the acetone which has not been converted, is re-cycled with the water or the alcohol used as a solvent for the alkali metal hydroxide, the alkaline agent may be added to this mixture in the form of a powdered solid hydroxide, or as a concentrated aqueous or mixed water-alcohol solution but in that case it must always be added in quantities equal to that employed when it is directly introduced as an aqueous or alcoholic solution. In such an operation, care should be taken to see that the proportion of solvent remains at such a value that the mixture is homogeneous. Thus, in the case in which water is used as the solvent, this water cannot be re-cycled in its entirety since the condensation of the ketone, and in particular the acetone produces a supplementary quantity of water during each cycle. A re-cycling of the whole quantity of water would uselessly dilute the mixture and may adversely affect its homogeneity. For this reason, the excess water is thus eliminated. On the other hand, when an alcohol is used, it is eventually necessary to add the small quantity which has not been re-cycled by reason of mechanical losses or chemical conversions. This method of operation is preferably followed in the case of the operations following after the first.

One of the advantages presented by the present method thus resides in the fact that it does not necessitate any separation of the alcohol and the ketone, and especially of the acetone, during the extraction of the mesityl oxide or its homologues by fractional distillation of the mixture. It is sufficient to add to the ketone-alcohol mixture (and more particularly the acetone-alcohol mixture) recovered by distillation, the quantity of ketone, or of acetone, corresponding to that which has been converted by the reaction, as well as the necessary quantity of alkali metal hydroxide, that which has been used for the preceding cycle having been eliminated, either in the residues of distillation or in the aqueous layer which is generally decanted after the light fractions have been distilled.

In the case of acetone (for the ketones homologous with acetone, similar reactions are produced to give homologues of the elements obtained with acetone) in order to increase the quantity of mesityl oxide produced, the crude solution containing essentially the mesityl oxide formed, the non-converted acetone, and the alkaline catalyst may be allowed to settle at a low temperature (0 to 20° C.). This phase of repose has the object of converting a part of the remaining acetone into di-acetone-alcohol following a process identical to that which would take place if this mixture did not contain mesityl oxide. It is then sufficient to distill the solution in the presence of a small quantity of acid water so as to separate first of all the acetone and the alcohol (which may be in the form of an azeotrope) and then the mesityl oxide, which thus includes the sum of that which was produced by the condensation in the heated reactor under pressure, and of that which is derived from the practically quantitative dehydration of the di-acetone-alcohol formed during the course of the second stage of preparation. Under these conditions, the global proportion of transformation of the acetone to mesityl oxide may reach 35 to 40% at each cycle.

Instead of carrying out the distillation process in an acid medium, it is also possible to operate in a strictly neutralised medium. In this case, it is possible to separate out the following fractions:

(1) Acetone and alcohol which will be re-cycled,
(2) Mesityl oxide and water,
(3) Di-acetone-alcohol,
(4) In some cases, isophoron.

It may be necessary to carry out this distillation under reduced pressure, at least starting from the moment at which the acetone and the alcohol will have been eliminated, with the object of avoiding the decomposition of the less volatile products which could take place if the distillation temperature were too high.

It may also be necessary to separate the aqueous phase, containing the alkali metal hydroxide or its neutralisation products, which is decanted after the alcohol and the acetone have been eliminated and which could interfere with the later process of distillation.

The observations which have been made above bring out clearly various other advantages of the method in accordance with the present invention. In the first place, its simplicity: whilst up to the present time it was, in fact, necessary to operate the process in two stages, namely, to carry out first the alkaline condensation of the acetone to di-acetone alcohol with a proportion of conversion which does not in general exceed 15%, then to separate the di-acetone alcohol from the major part of the acetone and apply to the former a treatment in an acid medium followed by distillation; the present method produces the mesityl oxide directly in one single continuous treatment, starting from acetone and with a high proportion of conversion.

In addition, the operation carried out in accordance with the invention has a very high efficiency; unlike that which happens in the case of known processes, there is obtained with the present method practically no resinous or little-volatile by-product.

Finally, the method in accordance with the invention brings with it the possibility of varying at will the proportions of mesityl oxide, isophoron and, in some cases, of di-acetone-alcohol which are formed.

There have been shown on the attached drawings two diagrammatic forms of embodiment of an apparatus for carrying into effect the method in accordance with the present invention.

Figure 1:
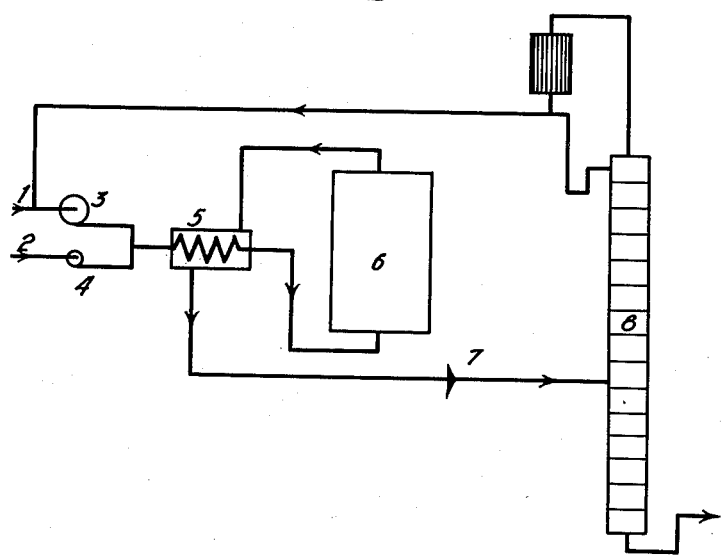
FIG. 1 is a diagram of an apparatus for obtaining mesityl oxide.

In the apparatus shown in FIG. 1, the acetone and the alkaline solution are introduced respectively at 1 and at 2, from which they are brought up to the necessary pressure by the pumps 3 and 4. The mixture then passes, in a coil for example, through a heat exchanger 5 in which it is heated, after which it passes through the reactor 6 which is maintained at the desired temperature. At the outlet of the reactor 6, the mixture is again passed into the heat exchanger 5 in which it is cooled; it is then eventually expanded through the valve 7 and then is passed into the column 8 from which the acetone is drawn off from the top together with all or part of the alkaline solvent (which are re-cycled) and from the base, the mesityl oxide and the isophoron are drawn off, together with a little decanted water which the alkaline catalyst contains.

Figure 2:
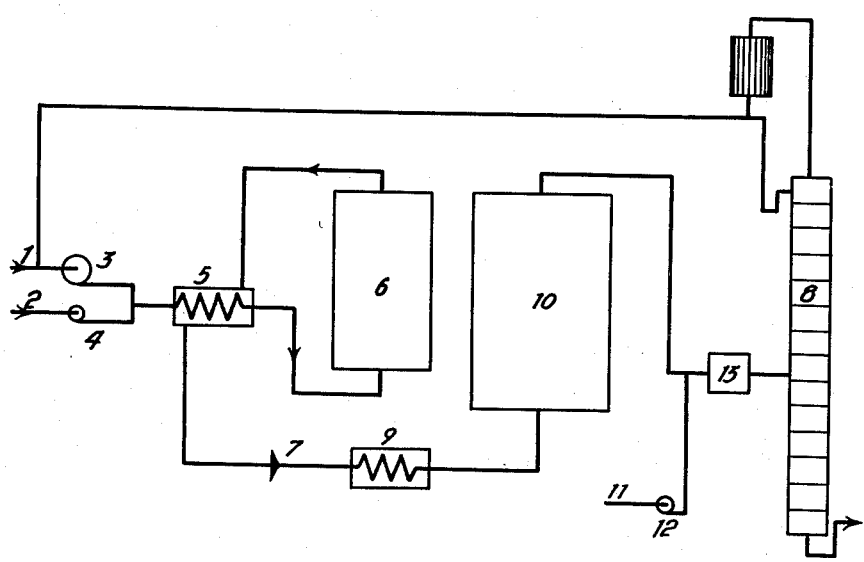
FIG. 2 shows an apparatus in which there is also produced di-acetone-alcohol at low temperature.

In FIG. 2, there has been shown diagrammatically an installation in which advantage is taken of the supplementary formation of di-acetone-alcohol at low temperature. In this case, the reaction mixture passing out of the heat exchanger 5 and through the valve 7, is first of all cooled by passing through the cooler 9 instead of being led directly to the distilling column. It is then passed through the reaction chamber 10 in which it is kept at a temperature close to that of the atmosphere. Finally, it is neutralised by the addition of an acid introduced at 11 by the pump 12. It passes through the mixer 13 and is then introduced into the column 8. From the bottom of this column 8, there is drawn off, either a mixture of mesityl oxide and of di-acetone alcohol (in the case in which the alkaline catalyst has been exactly neutralised), or of mesityl oxide alone (in the case in which an excess quantity of acid has been used in the neutralising, thus causing the decomposition of the di-acetone-alcohol). There is also taken off from the base of this column, a little water containing in solution the salts produced by the neutralisation of the catalyst and, in some cases, a little isophoron.

The invention is explained in fuller detail below, with reference to a certain number of practical examples.

Example 1

In a vessel, heated to a temperature of 100° C., there has been passed in a continuous manner, a mixture of acetone and a methanolic solution of potassium hydroxide in the following proportions: acetone—100 moles (or 5,808 grams); methanol—290 cu. cm.; potassium hydroxide—7.7 grams. The speed of flow of this mixture through an expansion valve was such that the heated space was passed through in 30 minutes. The product drawn-off was left to rest for five hours at a temperature of 10° C. Phosphoric acid was then added to it in excess quantity with relation to that necessary to neutralise the potassium hydroxide introduced. The mixture was then subjected to a fractional distillation during the course of which the following products were collected:

First fraction—290 cu. cm. of methanol mixed with 29.3 moles of acetone;
Second fraction—41.7 moles of acetone;
Third fraction—11.2 moles of mesityl oxide obtained from the conversion of 22.4 moles of acetone. The second and third fractions contain the water of the reaction;
Fourth fraction—0.5 mole of isophoron obtained from the conversion of 1.5 moles of acetone.

The quantity of residues was insignificant.

The difference between the quantity of acetone employed and found again as such or in the form of reaction products, was only constituted by losses due to evaporation which are inevitable during the course of an operation on this scale. The same condition is true of the examples following.

Example 2

Into a vessel heated to a temperature of 100° C., there was passed in a continuous manner a mixture of acetone and an ethanolic solution of potassium hydroxide in the following proportions: Acetone—100 moles (or 5,808 grams); ethanol—290 cu. cm.; potassium hydroxide—7.7 grams. The speed of flow through an expansion valve was such that the heated space was passed through in 30 minutes. The product delivered was left to rest for five hours at a temperature of 10° C. Phosphoric acid was then added to this product in excess quantity in relation to that necessary to neutralise the potassium hydroxide introduced. The mixture was then subjected to a fractional distillation during the course of which the following products were collected:

First fraction—66.8 moles of acetone;
Second fraction—290 cu. cm. of ethanol at 96%;
Third fraction—12.6 moles of mesityl oxide obtained from the conversion of 25.2 moles of acetone. The second and third fractions contained the water of the reaction.
Fourth fraction—1 mole of isophoron obtained from the conversion of 3 moles of acetone.

The quantity of residues was insignificant.

Example 3

Into a vessel heated to a temperature of 100° C., there was passed in a continuous manner a mixture of acetone and a methanolic solution of potassium hydroxide in the following proportions: acetone—100 moles (or 5,808 grams); methanol—290 cu. cm.; potassium hydroxide—50.5 grams. The speed of flow of this mixture through an expansion valve was such that the heated space was passed through in 30 minutes. The product drawn-off was left to rest for five hours at a temperature of 10° C. Phosphoric acid was then added to it in excess quantity in relation to that necessary to neutralise the potassium hydroxide introduced. The mixture was then subjected to a fractional distillation during the course of which the following products were collected:

First fraction—290 cu. cm. of methanol mixed with 29.3 moles of acetone;
Second fraction—30.3 moles of acetone;
Third fraction—15.5 moles of mesityl oxide obtained from the conversion of 31 moles of acetone. This fraction contained the water of the reaction.
Fourth fraction—0.8 mole of isophoron obtained from the conversion of 2.4 moles of acetone.

The quantity of residues corresponded to the conversion of about 2 moles of acetone.

Example 4

Into a vessel heated to a temperature of 150° C., there was passed in a continuous manner a mixture of acetone and an aqueous solution of potassium hydroxide in the following proportions: acetone—100 moles (or 5,808 grams); water—1380 cu. cm.; potassium hydroxide—7.7 grams. The speed of flow of this mixture through an expansion valve was such that the heated space was passed through in 60 minutes. The product drawn-off was left to rest for five hours at a temperature of 10° C. Phosphoric acid was then added to it in excess quantity in relation to that necessary to neutralise the potassium hydroxide introduced. The mixture was brought up to intermittent boiling for a period of one hour and then a fraction constituted essentially by 76 moles of acetone was separated out by distillation. After cooling, the lower aqueous layer was decanted and the liquid was then dried over anhydrous sodium sulphate. The liquid thus treated was then distilled; there was then obtained practically nothing but mesityl oxide, the quantity collected—11 moles—corresponding to the conversion of 22 moles of acetone. The quantity of acetone converted to derivatives other than mesityl oxide was less than 1% of the quantity of acetone employed.

Example 5

Into a vessel heated to a temperature of 150° C., there was introduced in a continuous manner a mixture of acetone and aqueous solution of potassium hydroxide in the following proportions: acetone—100 moles (or 5,808 grams); water—2,480 cu. cm.; potassium hydroxide—58 grams. The speed of flow of this mixture through an expansion valve was such that the heated space was passed through in 30 minutes. The product drawn-off was left to rest for 5 hours at a temperature of 10° C. Phosphoric acid was then added to the mixture in excess quantity in relation to that necessary for the neutralisation of the potassium hydroxide introduced. The mixture was then brought up to the point of intermittent boiling for one hour, after which a fraction constituted essentially by 76 moles of acetone was separated out by distillation. After cooling, the lower aqueous layer was decanted and the liquid was dried over anhydrous sodium sulphate. The liquid thus treated was then distilled; there was collected first of all a fraction constituted by mesityl oxide, the quantity of which obtained (10.5 moles) corresponded to the conversion of 21 moles of acetone, and then a fraction composed of isophoron (0.3 mole) this quantity corresponding to the conversion of about 1 mole of acetone.

The quantity of derivatives higher than isophoron was insignificant.

Example 6

Into a vessel heated to a temperature of 150° C., there was passed in a continuous manner a mixture of acetone and of an aqueous solution of potassium hydroxide in the following proportions: acetone—100 moles (or 5,808 grams); water—275 cu. cm.; potassium hydroxide—7.7 grams. The speed of flow of this mixture through an expansion valve was such that the heating space was passed through in 60 minutes. The product delivered was left for a period of five hours at rest at a temperature of 10° C. Phosphoric acid was then added to the mixture in excess quantity in relation to that necessary for the neutralisation of the potassium hydroxide introduced. The mixture was then brought up to intermittent boiling for one hour and a fraction composed essentially of 67 moles of acetone was then separated out by distillation. After cooling, the lower aqueous layer was then decanted and the liquid was dried over anhydrous sodium sulphate. The liquid thus treated was then distilled. There was first of all collected a fraction composed essentially of mesityl oxide of which the quantity obtained (11.75 moles) corresponded to the conversion of 23.5 moles of acetone, then a fraction composed by isophoron (1.7 moles) the quantity of which corresponded to the conversion of 5 moles of acetone, and finally a fraction composed of higher condensation products corresponding to the conversion of about 2 moles of acetone.

Example 7

Into a vessel heated to a temperature of 120° C., there is passed in a continuous manner a mixture of methyl-ethyl-ketone and a methanolic solution of potassium hydroxide in the following proportions: methyl-ethyl-ketone (anhydrous)—100 moles (or 7,210 grams); methanol—360 cu. cm.; potassium hydroxide—10 grams. The speed of flow of this mixture through an expansion valve was such that the heating space was passed through in 30 minutes. The product delivered was left for a period of five hours at rest at a temperature of 10° C. Phosphoric acid was then added to the mixture in excess quantity in relation to that necessary for the neutralisation of the potassium hydroxide introduced. The mixture was then subjected to a fractional distillation, during the course of which the following products were collected:

First fraction—360 cu. cm. of methanol mixed with 84 moles (or 6,060 grams) of methyl-ethyl-ketone and a little water.

Second fraction—7 moles (or 880 grams) of a mixture of ethylenic ketones of $C^8$: essentially methyl-3-heptene-3 one 5 and di-methyl-3-4-hexene-3 one 2 derived from the conversion of 14 moles (or 1010 grams) of methyl-ethyl-ketone.

Third fraction—0.64 mole (or 115 grams) of an ethylenic ketone of $C^{12}$, the higher homologue of isophoron, derived from the conversion of 1.92 moles (or 138 grams) of methyl-ethyl-ketone.

The quantity of the higher condensation products was not appreciable.

Example 8

Into a vessel maintained at a temperature of 120° C., there was passed in a continuous manner a mixture of acetone and an ethanolic solution of sodium hydroxide in the following proportions by weight: acetone—100 parts; ethanol—3.8 parts; sodium hydroxide—0.1 part. The self generated pressure became steady at a value of 6 atmospheres absolute. The speed of flow of the mixture through the vessel was regulated in such a way that the average time of the mixture in the vessel was one hour. The product delivered was then distilled without neutralisation. There was then collected, expressed in weight with respect to the acetone employed: 11.5% of mesityl oxide; 2% of isophoron and 0.3% of higher condensation products. In addition, there was collected practically the whole quantity, as such, of the non-converted acetone.

What we claim is:

1. A method of manufacturing mesityl oxide including heating, for a period of about 15 to 60 minutes at a temperature between about 75 to 120° C., a single phase system comprising acetone and an alkali metal hydroxide in solution in an alcohol solvent, said alkali metal hydroxide being present in an amount of about 0.5 to 7 grams per liter of acetone.

2. A method as stated in claim 1 wherein said alcohol is from the group consisting of methanol and ethanol.

3. A method as claimed in claim 1 wherein said alkali metal hydroxide is potash.

4. A method as claimed in claim 1 wherein said alkali metal hydroxide is added as a dilute solution containing 10–180 grams of said hydroxide for each liter of solution.

5. A method of manufacturing mesityl oxide including heating, for a period of about 15 to 60 minutes at a temperature between about 75 and 120° C., a single phase system comprising acetone and 0.5 to 7 grams of an alkali metal hydroxide per liter of acetone, said alkali metal hydroxide being dissolved in a solvent containing alcohol, acidifying the resulting mixture and distilling the obtained acetone.

6. A method as claimed in claim 5 wherein said mixture is neutralized during the acidification step.

7. A method as claimed in claim 5 wherein said acidification step is pursued until said mixture contains free acidity.

8. A method as claimed in claim 5 wherein said solvent is a mixture of water and an alcohol from the group consisting of methanol and ethanol.

9. A method as claimed in claim 5 wherein said heating is performed in a closed vessel and produces a limited increase in pressure.

10. A continuous method of manufacturing mesityl oxide including heating a single phase system containing acetone and an alkali metal hydroxide in a solvent containing alcohol for a period of about 15 to 60 minutes at a temperature between about 75 and 120° C., said alkali metal hydroxide being present in a quantity of about 0.5 to 7 grams per liter of acetone, then distilling off the obtained mesityl oxide and recycling the residue.

11. A method as claimed in claim 10 wherein said solvent is a mixture of water and an alcohol from the group consisting of methanol and ethanol.

References Cited in the file of this patent

UNITED STATES PATENTS

| | | |
|---|---|---|
| 1,925,317 | Fuchs | Sept. 5, 1933 |
| 2,309,650 | McAllister et al. | Feb. 2, 1943 |
| 2,419,051 | Ballard et al. | Apr. 15, 1947 |

FOREIGN PATENTS

| | | |
|---|---|---|
| 143,181 | Australia | Sept. 4, 1951 |
| 492,239 | Canada | Apr. 21, 1953 |

OTHER REFERENCES

Surmin: Chem. Abstracts, vol. 30, p. 3404 (1936).